United States Patent
Chin et al.

(10) Patent No.: US 6,819,918 B2
(45) Date of Patent: Nov. 16, 2004

(54) IMSI CONVERSION METHOD

(75) Inventors: Terry D. Chin, Naperville, IL (US);
Anita R. Garvert, Naperville, IL (US);
Eric H. Henrikson, Redmond, WA (US)

(73) Assignee: Lucent Technologies Inc., Murray Hill, NJ (US)

( * ) Notice: Subject to any disclaimer, the term of this patent is extended or adjusted under 35 U.S.C. 154(b) by 596 days.

(21) Appl. No.: 09/824,082

(22) Filed: Apr. 3, 2001

(65) Prior Publication Data

US 2002/0142752 A1 Oct. 3, 2002

(51) Int. Cl.[7] .................................................. H04L 1/66
(52) U.S. Cl. .................... 455/411; 455/551; 455/552.1; 455/414.4; 370/342
(58) Field of Search ................................ 455/411, 551, 455/412.1, 412.2, 414.4, 461, 561, 552.1, 422.1, 458; 370/320, 335, 342, 347, 545

(56) References Cited

U.S. PATENT DOCUMENTS

| | | | | | |
|---|---|---|---|---|---|
| 5,337,344 | A | * | 8/1994 | Alvesalo | 455/403 |
| 5,867,788 | A | * | 2/1999 | Joensuu | 455/445 |
| 6,094,578 | A | * | 7/2000 | Purcell et al. | 455/426.1 |
| 6,445,929 | B2 | * | 9/2002 | Chandnani et al. | 455/461 |
| 6,493,551 | B1 | * | 12/2002 | Wang et al. | 455/432.1 |
| 6,515,970 | B1 | * | 2/2003 | Lindsay et al. | 370/280 |
| 6,603,761 | B1 | * | 8/2003 | Wang et al. | 370/352 |
| 6,611,516 | B1 | * | 8/2003 | Pirkola et al. | 370/352 |
| 2002/0119793 | A1 | * | 8/2002 | Hronek et al. | 455/466 |

* cited by examiner

*Primary Examiner*—Cong Van Tran

(57) ABSTRACT

A method is disclosed for processing an International mobile Station Identifier (IMSI) which may be received in different formats into a common uniform binary format of two n-bit binary words for processing within a network element such as a Mobile Switch Center (MSC) or other switching system or device or other call processing apparatus.

19 Claims, 9 Drawing Sheets

FIG. 3

| MCC | IMSI_S | | IMSI_11_12 | IMSI_ADDR_NUM |
|---|---|---|---|---|
| | IMSI_S2 | IMSI_S1 | | |
| 310 | 123 | 4567890 | 00 | NONE FOR CLASS 0 IMSI |

FIG. 4

| MCC | IMSI_S | | IMSI_11_12 | IMSI_ADDR_NUM |
|---|---|---|---|---|
| | IMSI_S2 | IMSI_S1 | | |
| 678 | 789 | 8234567 | 06 | 4 |

IMSI CONVERSION METHOD

FIELD OF THE INVENTION

The present invention relates to the processing of International Mobile Station Identity (IMSI) information used in mobile telephone communications systems.

DISCUSSION OF THE RELATED ART

The use of mobile station identifiers in wireless communication is widespread for registration, authentication, SMS (short message service), and other call processing and billing purposes. With the proliferation of mobile communications devices throughout the world, efforts have been made to standardize the mobile station identifiers so that a mobile station can be used in many different countries, provided it is capable of interconnecting with the type of service (e.g., TDMA, CDMA) offered. To this end, ITU-T E.212 43 (hereinafter E.212) recommends an international identification plan for land mobile stations and offers a recommendation to establish principles for allocating an International Mobile Station Identity (IMSI) to mobile stations. The idea is to enable mobile stations to roam among public land mobile networks located in different countries by adherence to an international identification plan with a unique international identification for each mobile station.

The E.212 recommendation is directed to the IMSI numbering plan only, and the numbering plan may be implemented on an over-the air interface or through a signaling interface in a wireless network in a variety of ways. The E.212 numbering plan recommendation identifies and uses the following terms:

(1) Mobile Country Code (MCC) which is the part of the mobile station identifier which uniquely identifies the country of domicile of the mobile station; it is the first part of an IMSI designation and is 3 digits long;

(2) Mobile Network Code (MNC), which uniquely identifies the home network of the mobile station; it is the second part of an IMSI designation and follows the MCC and is 1 to 3 digits long;

(3) Mobile Station Identification Number (MSIN), which uniquely identifies the mobile station within a network; it is the third part of an IMSI designation and follows the MNC;

(4) National Mobile Station Identity (NMSI), which uniquely identifies the mobile station nationally; and is formed of the MNC and MSIN;

(6) International Mobile Station Identity (IMSI) which uniquely identifies the mobile station internationally and is formed of the MCC, MNC and MSIN.

The relationship of the MCC, MNC, MSIN, NMSI and IMSI as set out in E.212 is illustrated in FIG. 1.

The recommendation continues by specifying that only numerical characters (0–9) shall be used and that the IMSI shall be variable in length, never to exceed 15 digits. The MCC shall always consist of 3 digits. The national mobile station identity is to be assigned by each network administration.

The assigned IMSI for a mobile may be stored in the mobile station, transmitted in an over-the-air interface and/ or through signaling interfaces, and stored and processed within the network in a variety of ways. It is important to note that because of the flexibility given to various network administrations, once concatenated to form E.212 IMSI, it is impossible to derive algorithmically the various components which go into forming an assigned IMSI. Thus, the manner in which IMSI is formatted, transmitted and processed varies on various interfaces and in different types of networks.

For example, for an IS-95 CDMA system, the air interface specification, as set out in Section 6.3.1 at IS-95, partitions the IMSI into smaller code entities for efficiency.

The partitioning of the IMSI into smaller entities allows the interface to define methods in which only some of the digits are transmitted for a given call. The remaining digits are known to the base station and broadcast to mobiles in an overhead channel. For CDMA mobiles the IMSI, as defined in E.212, is partitioned into the following components: MCC, IMSI_S (which is sub-divided into IMSI_S1 and IMSI_S2) and finally IMSI_11_12. Under the CDMA IS-95 standard, an IMSI that is 15 digits in length is called a class 0 IMSI. An IMSI that is less that 15 digits is called a class 1 IMSI. The first 3 digits of the IMSI are the MCC. These digits are encoded into 10 bits in the manner defined in the IS-95 standard. The IMSI_S is a 10 digit (34 bit) number derived from the IMSI. When the IMSI has 10 or more digits, IMSI_S is equal to the last 10 digits. When the IMSI has fewer than 10 digits, the least significant digits of IMSI_S are equal to the IMSI and zeros are added to the most significant side to obtain a total of 10 digits. The 10 digit IMSI_S consists of 3 and 7 digit parts, called IMSI_S2 and IMSI_S1 respectively. The IMSI_S2 is stored in 10 bits and the IMSI_SI in 24 bits. The IMSI_11_12 is the $11^{th}$ and $12^{th}$ digits of the IMSI. A class 1 IMSI is padded with leading zeroes if needed when computing the IMSI_11_12. The IMSI_11_12 is encoded in 7 bits. As noted, per E.212, the NMSI is defined as the digits of the IMSI after the MCC.

The encoding scheme for the various CDMA IMSI components entails representing digits in binary coded decimal and then modulating the values to minimize the number of bits required for storage. For example, if the first digit is D1 and the second D2, the binary representation is found by computing 10×D1+D2−11.

When a class 1 IMSI is transmitted over-the-air, an additional parameter, IMSI_ADDR_NUM is sent which is the NMSI length minus four. The IS-95 CDMA IMSI air interface format is shown in FIG. 2.

For example, in a CDMA system the IMSI 310001234567890, which is a class 0 IMSI, is represented by encoding the following, as shown in FIG. 3:

MCC=310
IMSI_11_12=00
IMSI_S2=123
IMSI_S1=4567890

FIG. 4 shows an example of a class 1 IMSI having the digit identifier 67898234567:

MCC=678
NMSI=98234567 (per E.212)
IMSI_11_12=06
IMSI_S2=789
IMSI_S1=8234567
IMSI_ADDR_NUM=4 (NMSI Length−4) NMSI length=8 in this example.

It should be noted that the CDMA air interface allows transmission of an E.212 IMSI which begins in a leading zero. This is accomplished by use of the IMSI_ADDR_NUM length parameter which is sent for any class 1 IMSI.

The manner in which the IMSI is handled in an IS-136 TDMA system is quite different. As spelled out in Section 8.1.1.2, IS-136, the IMSI is always encoded as a 50-bit Mobile Station Identification (MSID). Any IMSI less than 15 decimal digits in length is first padded with leading zero digits (i.e., d15, d14 . . . ) as necessary to produce a 15 decimal digit string. The 15 decimal digits are then divided in 5 groups of 3 digits each. Each 3 digit group is translated into its 10-bit binary equivalent using a normal decimal to binary conversion (e.g., 271=0100001111). The resulting 10-bit groups are then concatenated to form a 50-bit MSID for transmission in the over-the-air interface. At the receiving end, the actual IMSI is recovered by removing all leading zero digits that may result when translating the 50-bit MSID back into 15 decimal digits. The TDMA encoded IMSI format is shown in FIG. 5. It should be noted that leading digit zero values are considered as fill and not considered part of the IMSI.

The foregoing are but two examples of how IMSI is formatted and transmitted over the air differently in a CDMA and TDMA system. The IMSI may also be formatted and transmitted differently in an over-the-air or signaling interface in other types of wireless systems which use the IMSI.

Accordingly, because of the different way the IMSI is formatted and transmitted in the over-the air interface and through a signaling interface between various wireless and network elements as specified in the appropriate standards documents, different IMSI processing software is required on a network element for each affected interface. This creates a burden on the network element operator as different software is required to handle each IMSI format on each interface (air, signaling) for each functional area (call processing, billing, registration, authentication, short messaging, etc.) The IMSI processing burden may slow such operations. A network element vendor would like to provide one unified set of software for the network element processing, no matter what interface format (e.g. TDMA air interface, CDMA air interface, ANSI-41, IS-634, Gr, Gs, Iu) is used. However the handling of IMSI differently in the different systems makes this a difficult objective to achieve.

BRIEF SUMMARY OF THE INVENTION

The present invention mitigates to a large degree the requirement for developing and maintaining different software for a network element which receives and processes IMSI information, such as, for example, as a Mobile Switching Center (MSC) or other network system or device.

The invention provides a method for converting an IMSI which may be received in a particular standardized format into a common uniform format for processing at the network element, e.g., at an MSC or other IMSI processing network system or device. Thus, no matter which over-the-air and/or signaling format is used the IMSI can be converted to a uniform format so that one set of programs, which process the IMSI in the uniform format can be written for registration, authentication, SMS service, resource allocation, billing, etc., and other call processing functions. In addition, the IMSI is converted into a uniform binary format which allows for its quick recognition and expedited processing. As a result, a vendor at a network element which processes the IMSI, for example, an MSC or other network system or device, can develop and maintain a single call processing program which can easily be provided with an appropriate IMSI conversion program at the front end.

These and other advantages and features of the invention will be more clearly understood from the following detailed description of the invention which is provided in connection with the accompanying drawings.

BRIEF DESCRIPTION OF THE DRAWINGS

FIGS. 3 and 4 are diagrams showing respective examples of formatting an IMSI in a CDMA system;

DETAILED DESCRIPTION OF THE INVENTION

The present invention as described and illustrated below provides for conversion of IMSI information, whether received in TDMA, CDMA or other standards format, into a common format for processing in the MSC or other network switching system or device. It should be understood that the invention may be used to convert any type of over-the-air interface or signaling interface IMSI format into a common uniform format for registration, authentication, SMS, billing, resource allocation or other call processing functions in a network.

Figure 1:
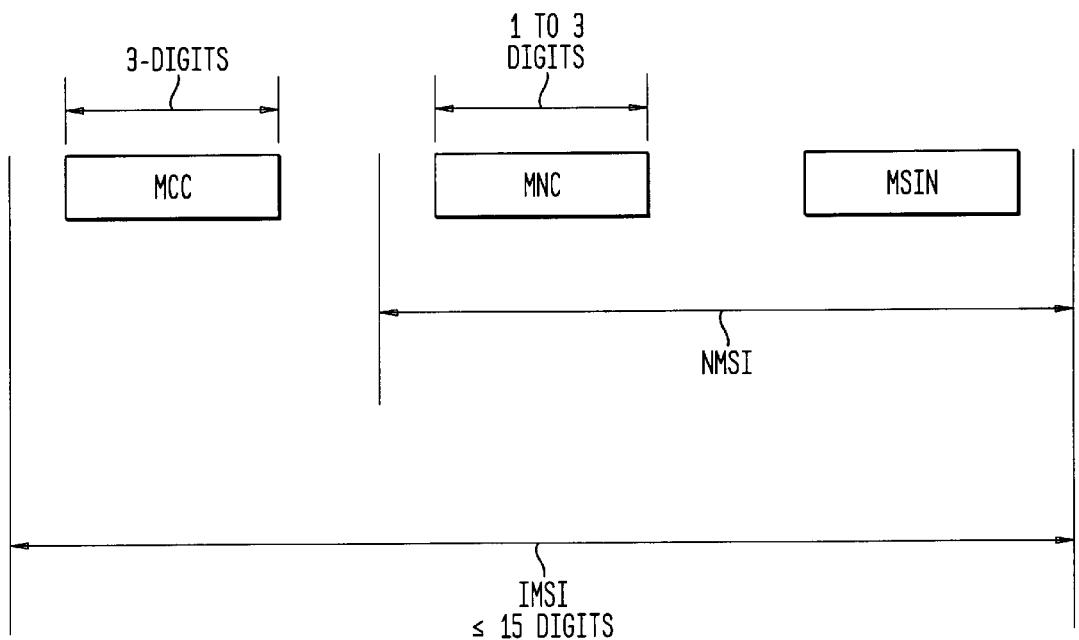
FIG. 1 is a diagram of a standardized IMSI.
Figure 2:
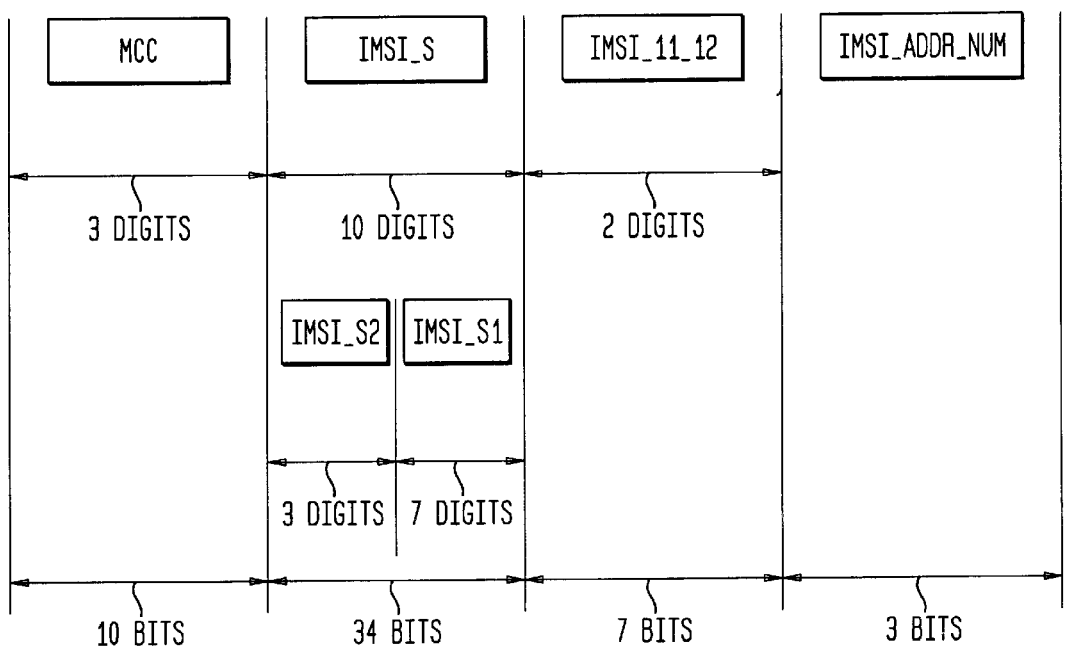
FIG. 2 is a diagram illustrating how an IMSI is formatted in a CDMA system.
Figure 5:
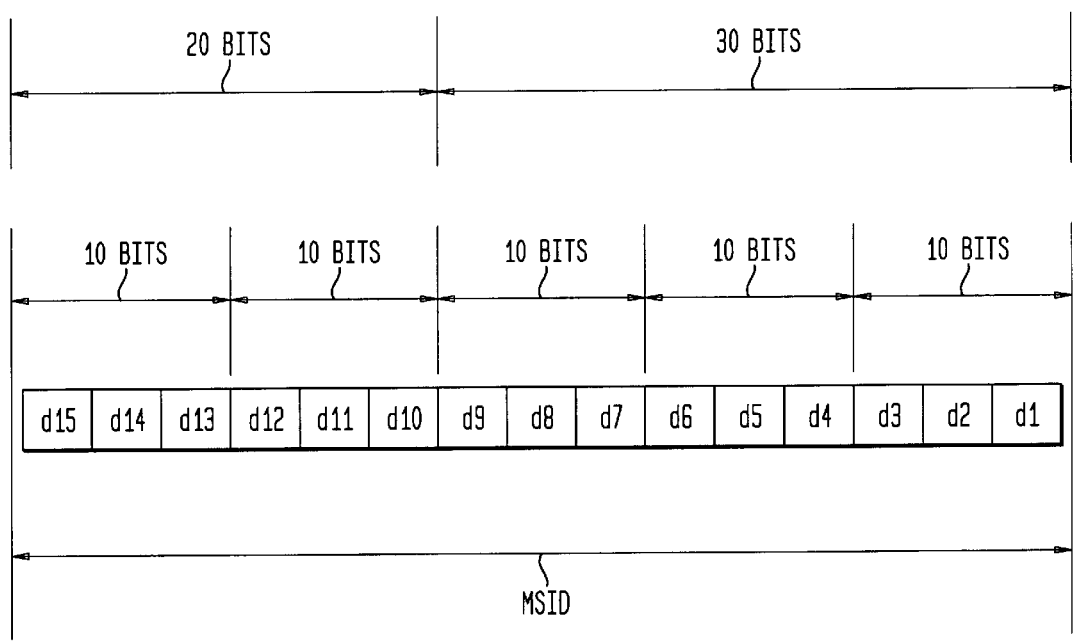
FIG. 5 is a diagram illustrating how an IMSI is formatted in a TDMA system.
Figure 6:
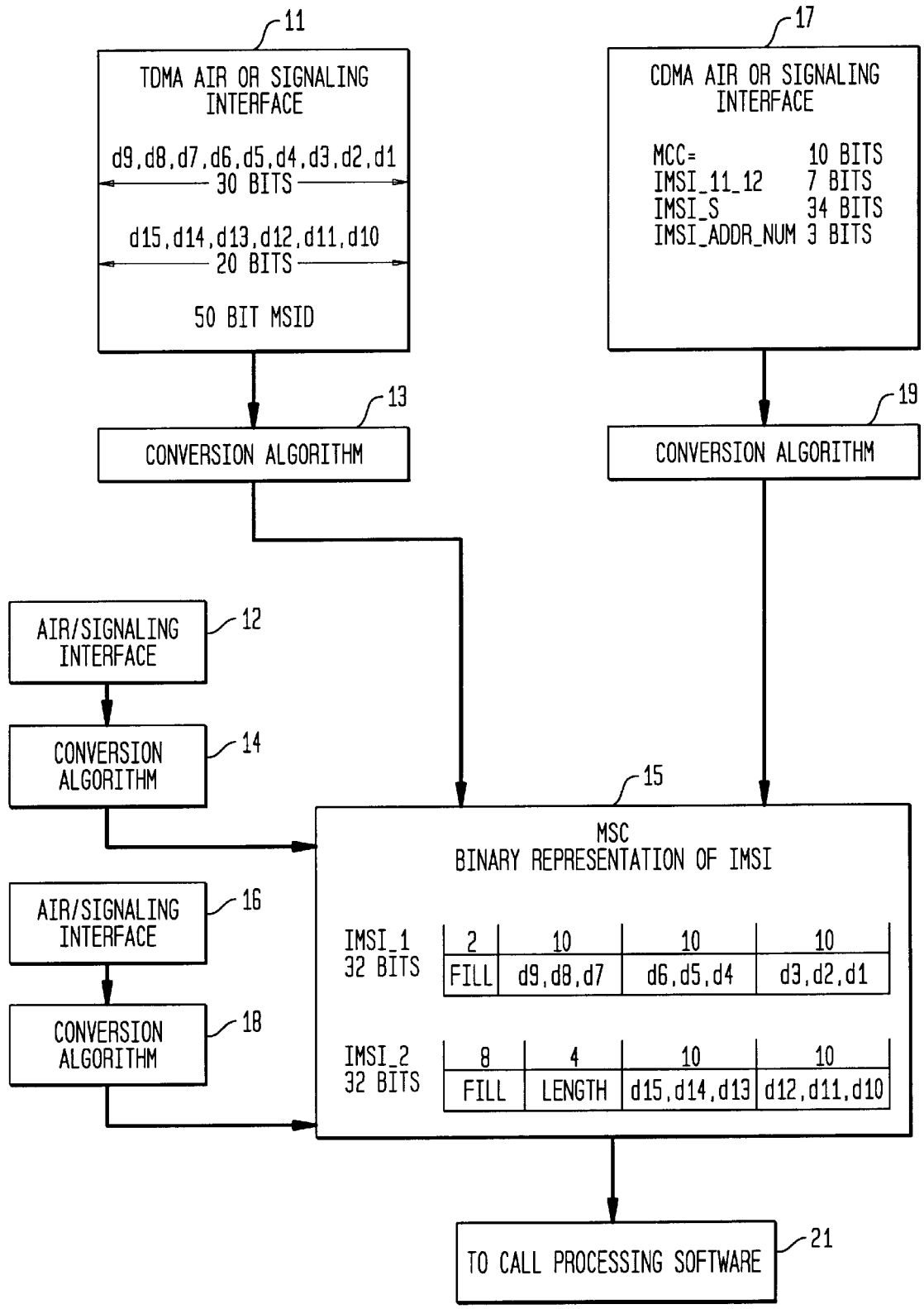
FIG. 6 is a diagram illustrating an exemplary embodiment of the invention.

FIG. 6 illustrates the overall algorithmic flow of how the invention is implemented for four different over-the-air or signaling interface standards, including TDMA 11, CDMA 17, and two other unspecified standards 12 and 16.

For purposes of simplifying the ensuing discussion, conversion of the IMSI for a TDMA and a CDMA system will be described in detail below, but it should be noted that the invention can be used to convert an IMSI from any standardized over-the-air or signaling format into a common uniform format for call processing functions.

Taking, first, implementation or signaling of the invention in a TDMA environment, an IMSI received over a TDMA air interface is generally illustrated as element 11 in FIG. 6. The IMSI information includes two components digits $d_1 \ldots d_9$ encoded as a 30-bit component, and digits $d_{10} \ldots d_{15}$ encoded as a 20-bit component forming a complete 50-bit MSID. The received 50-bit MSID is then processed by a conversion algorithm 13 which takes the TDMA IMSI information and presents it as two binary words imsi_1 and imsi_2, each being 32 bits long.

As shown in processing segment 15 of FIG. 6, the imsi_1 component includes the digits $d_1 \ldots d_9$ separated into 3 sets of 3 digits each. Thus, $d_1 \ldots d_3$, $d_4 \ldots d_6$, and $d_7 \ldots d_9$ each define a respective digit set. Each of these digit sets is encoded using 10 bits, thus forming 30 bits of the 32-bit imsi_1 with the last 2 bits being fill bits. The imsi_2 word includes the IMSI digits $d_{10} \ldots d_{15}$ broken into two sets of three digits as $d_{10} \ldots d_{12}$, and $d_{13} \ldots d_{15}$. Each of these latter two sets is encoded using 10 bits. The imsi_2 contains an additional parameter identified as length, which represents the length of the IMSI, and this is encoded as 4 bits. Finally, the last 8 bits of imsi_2 are fill bits.

The two 32 bit words imsi_1 and imsi_2 illustrated in FIG. 6 are used by a network element, e.g., an MSC, or other network system or device, for all call processing functions and the received IMSI, now encoded in the imsi_1 and imsi_2 words, are provided to the call processing software 21 for further operations.

FIG. 6 also illustrates the processing which occurs when the invention is employed in a CDMA environment. Here, the IMSI is received over a CDMA air signaling interface and includes the MCC as 10 bits of information, the IMSI_11_12 as 7 bits of information, the IMSI_S as 34 bits of information, and, if present, the IMSI_ADDR_NUM as 3 bits of information. The received IMSI information is then passed through a conversion algorithm 19 where, once again, the received IMSI information is formatted into the format illustrated within element 15 of FIG. 6, that is, into the imsi_1 and imsi_2 words, each 32 bits in length. Once again, after the IMSI information has been converted by the conversion algorithm 19 into the format illustrated in element 15, the IMSI information in the converted format is then passed in call processing software 21.

Thus, no matter what the format the IMSI information may be in as received from the over-the-air interface or through a signaling interface, it is converted into a common uniform format for processing. As a consequence, network call processing system or element, e.g., an MSC, can use common software for call processing, no matter what the over-the-air or signaling interface environment.

FIG. 6 also illustrates an IMSI received in an over-the-air or through a signaling interface for two other standardized wireless systems 12, 16 having respective conversion algorithms 14, 18, which convert a received IMSI into the format shown in element 15.

The operation of the conversion algorithms 13 and 19 illustrated in FIG. 6 will be described next, with the CDMA conversion algorithm 19 being described first with reference to FIGS. 7A, 7B and 7C.

The CDMA conversion algorithm 19 begins in processing segment 31 where the 10-bit MCC information is handled as follows: a digit 0 is given a decimal value of 10, and the three-digit MCC value is arrayed as m3, m2 and m1. Then, a binary conversion is performed using the formula 100×m3+10×m2+m1−111=a value B which is then converted into a binary value.

The IMSI_11_12 portion of the received IMSI information is handled in processing segment 33. The 7-bit IMSI_11_12 is converted into two digit values, j2, j1. Again, a digit of 0 is given a decimal value of 10, and the digit value is then converted into binary using the formula 10×d2+d1−11=B, and the value B is then converted into a binary value.

The IMSI_S information, which is received as 34 bits, is converted into 10 digits in processing segment 35. The digits are split into a first group of 3 digits, a second group of 3 digits, a third group of 1 digit and a fourth group of 3 digits, and are arrayed as illustrated in segment 35 of FIG. 7A.

Once the digits are arrayed, the same 3-digit sequence described above with reference to processing segment 31 is supplied on the 3-samples to convert each of the 3-digit values to a binary value. In addition, the 1-digit is also converted to binary, except that the digit value 0 is treated as digit value 10during binary encoding.

Figure 7A:
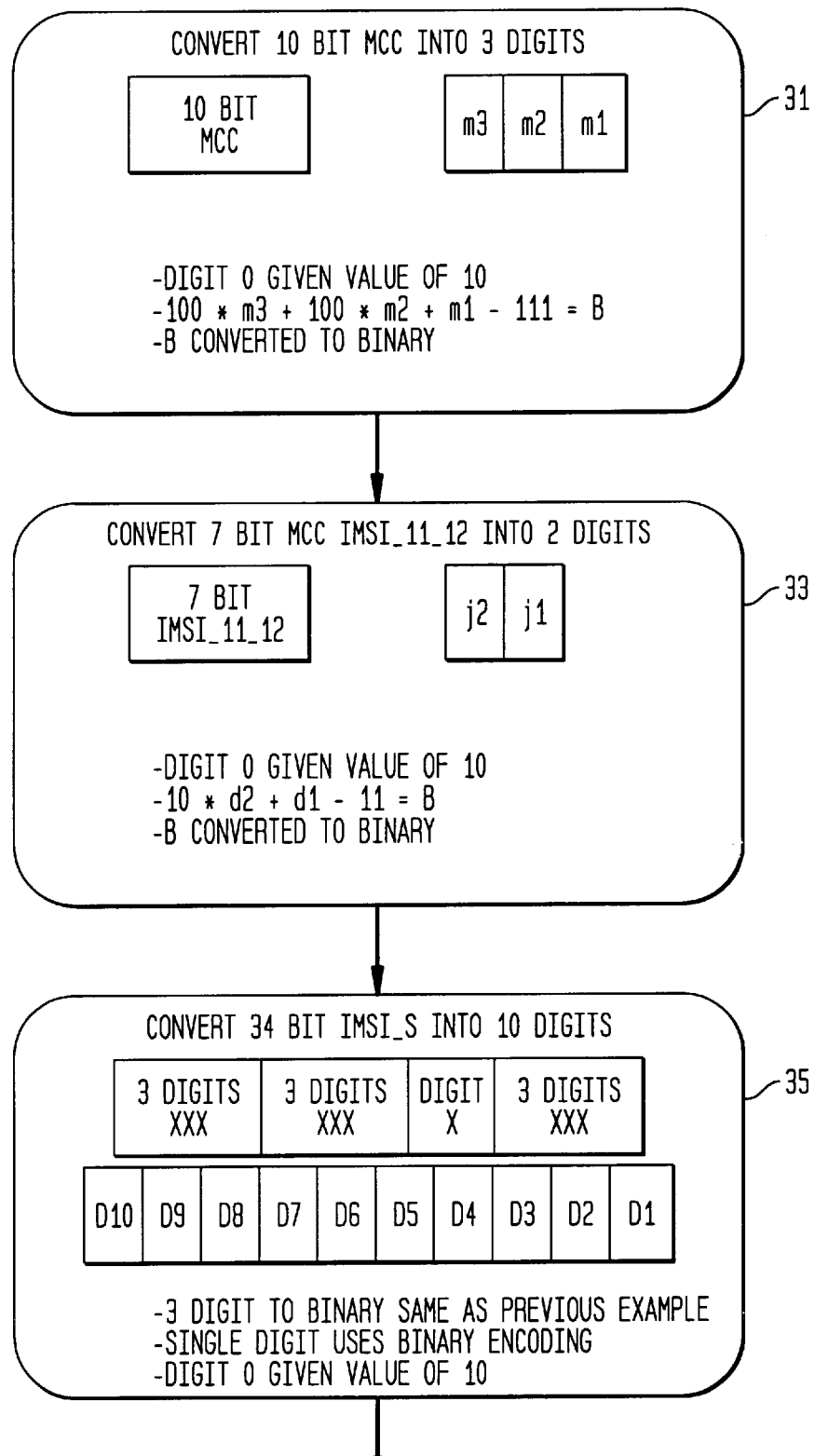
FIGS. 7A, 7B and 7C collectively illustrate a CDMA conversion algorithm illustrated in FIG. 6.
Figure 7B:
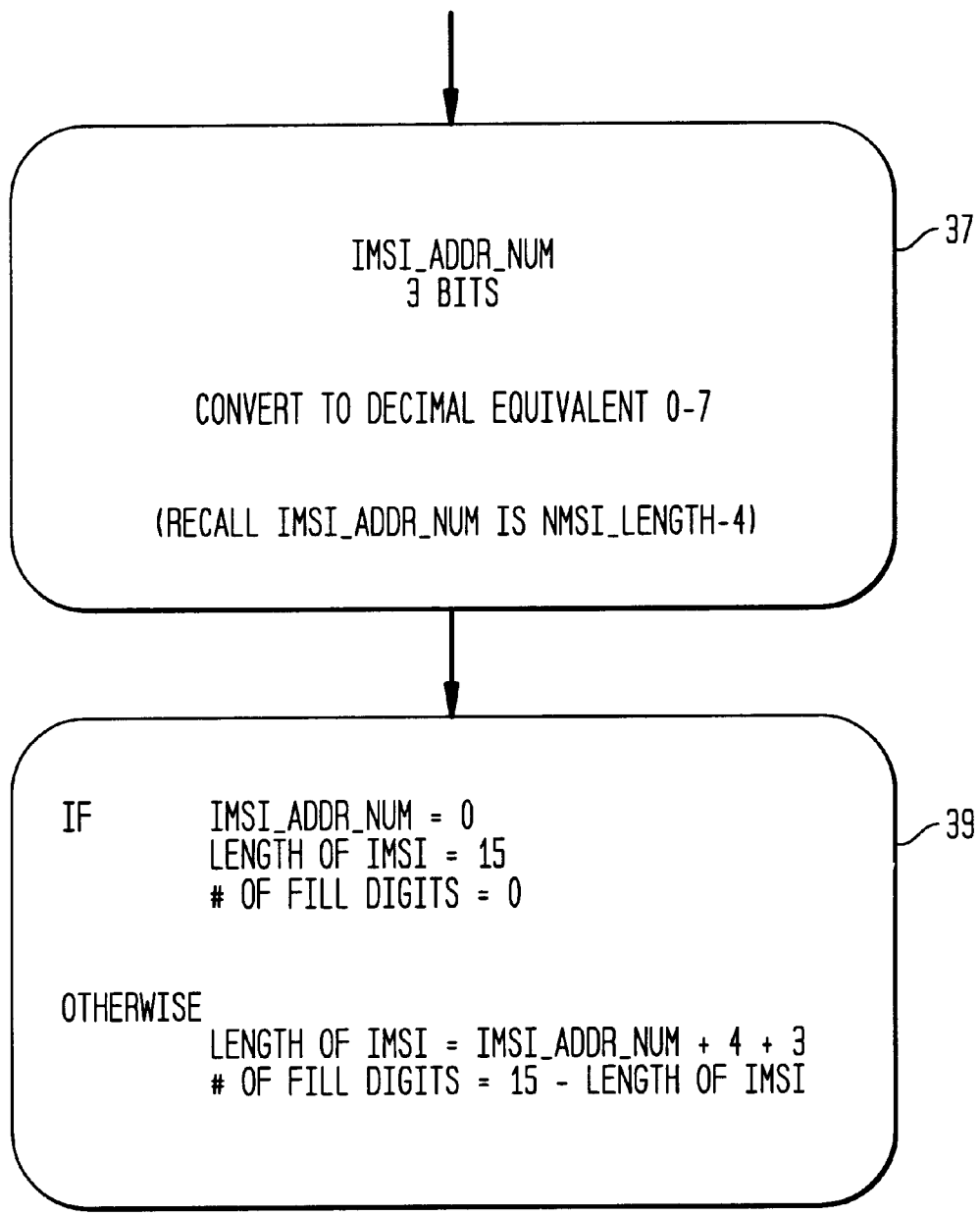

The process then proceeds to processing segment 37, illustrated in FIG. 7B in which the IMSI_ADDR_NUM value is processed, if present. This is a 3-bit value, and this is converted to its decimal equivalent value of 0 to 7. (It will be recalled that IMSI_ADDR_NUM=(NMSI_length_−4), and so the value will always be within the range of 0–7.)

After conversion to its decimal value, the conversion procedure proceeds to processing segment 39 where the decimal value from processing segment 37 is tested. If the decimal value of IMSI_ADD_NUM equals 0, then the length of the IMSI is deemed to be 15 digits, and the number of fill digits is deemed to be 0.

If IMSI_ADDR_NUM does not equal 0, then the length of the IMSI is determined as IMSI_ADDR_NUM+4+3. For example, if IMSI_ADD_NUM equals 3, then the IMSI length would be 3+4+3, or 10. Once the length of the IMSI is determined, then the number of fill digits is further determined by subtracting the length of the IMSI from 15.

Figure 7C:
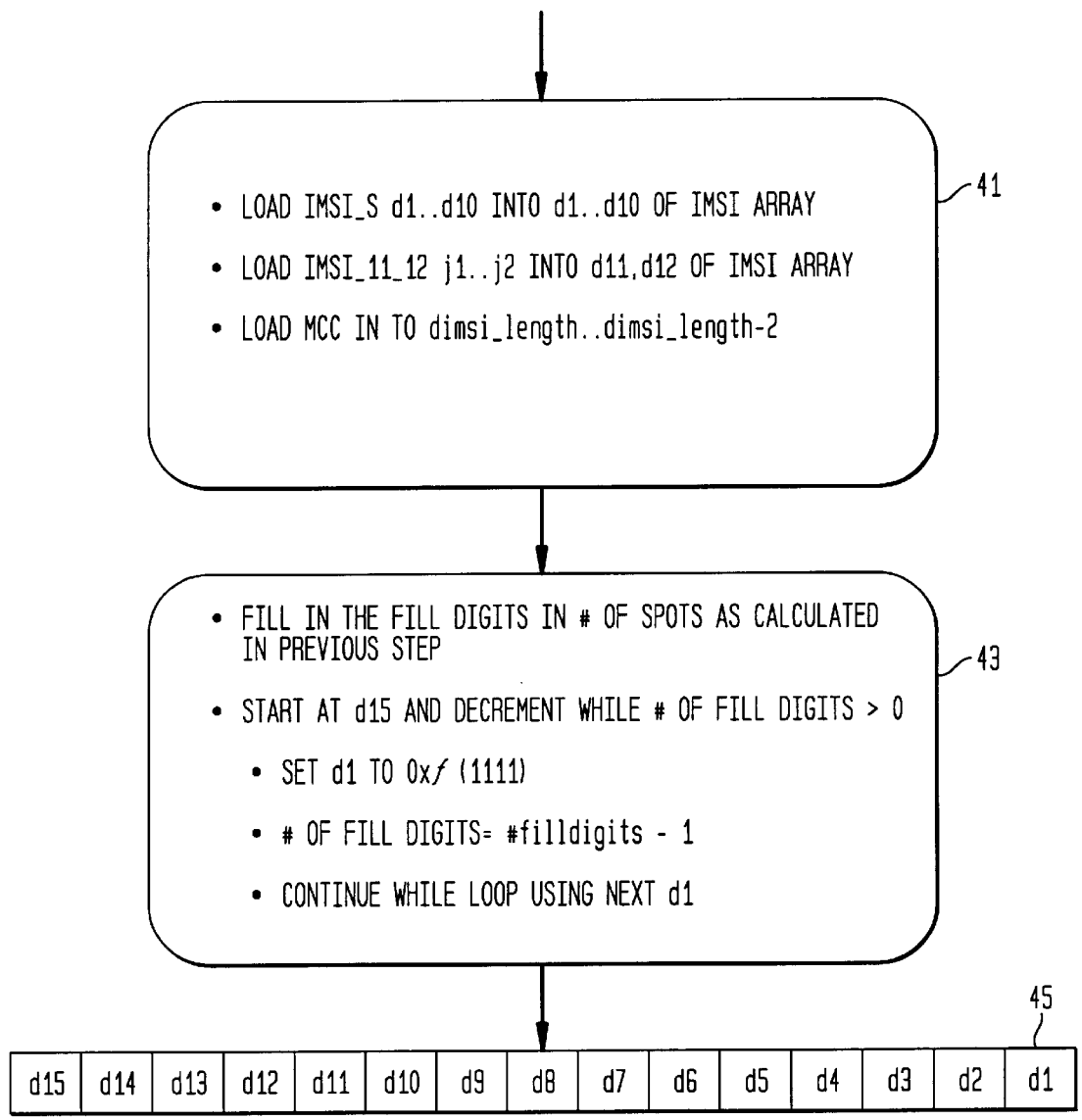

The manner in which the converted CDMA IMSI information is then placed in an IMSI array 45 is illustrated in FIG. 7C. In processing segment 41, the IMSI_S digits D1 . . . D10 are loaded into digit locations $d_1$ . . . $d_{10}$ of the IMSI array 45. The $j^1$ and $j^2$ values of IMSI_11_12 are loaded into the corresponding $d_{11}$ and $d_{12}$ positions of the IMSI array 45.

Finally, the MCC is loaded into the 3 digit positions $d_{imsi\_length}$ through $d_{imsi\_length-2}$. It should be noted that for a class 0 IMSI in CDMA format, where the IMSI length is always 15, the MCC will always be loaded into digit positions $d_{15}$, $d_{14}$, $d_{13}$ of the IMSI array 45. However, for a class 1 IMSI, where the IMSI is less than 15 digits long, the MCC is loaded in processing segment 41 at certain digit positions of the IMSI array 45 based on the length of the IMSI. Thus it is possible that the MCC digits are loaded over certain digits of the previously loaded IMSI_S, if the IMSI is not a class 0 IMSI. This is why the MCC is loaded in processing segment 41 into the digit positions $d_{imsi\_length}$ through $d_{imsi\_length-2}$.

Following processing segment 41, the conversion proceeds to processing segment 43 wherein fill digits in the IMSI array 45 are placed in the number of spots which were calculated in processing 39 at FIG. 7B. In this fill procedure, digit position 15 is first selected, and a fill digit is placed therein. The fill digit used is a binary value of 1111. After digit position $d_{15}$, is filled, the number of digits to be filled is decremented by 1, and if there are more fill digits to be filled, then the next digit position, here $d_{14}$, is likewise filled with binary value 1111. This process proceeds until there are no more fill digits. The fact that the fill value is not represented as the value zero permits an IMSI transmitted on the CDMA air interface to begin with a leading zero. If the IMSI_ADDR_NUM value or IMSI length is available, the value of the fill and the digit zero can be set the same. The loading of the IMSI array 45 has now been completed.

Figure 8:
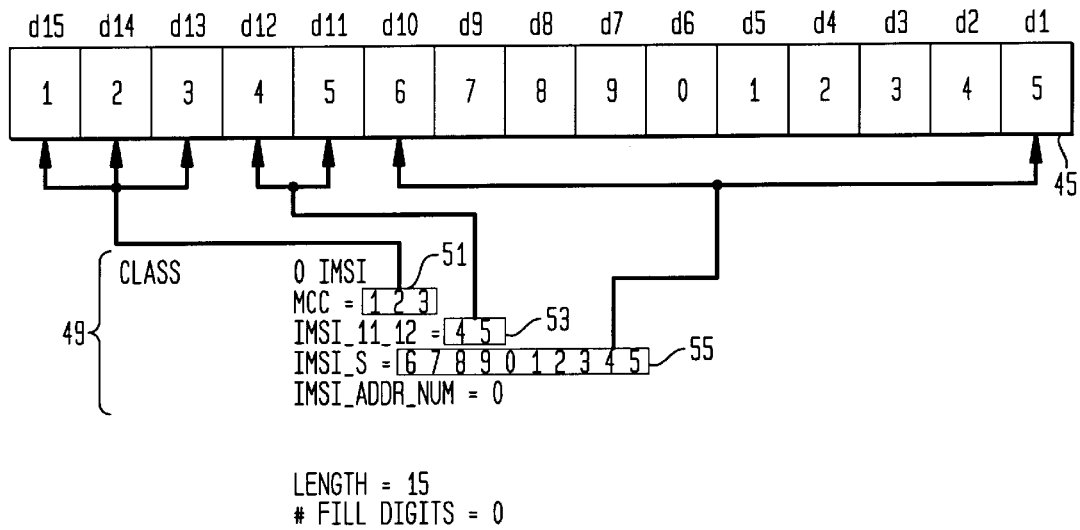
FIG. 8 illustrates a first example of the results obtained by the conversion algorithm depicted in FIGS. 7A, 7B and 7C.

FIG. 8 illustrates an example of loading of the IMSI array 45 for a class 0 IMSI 49 received in a CDMA system. Using the loading scheme described above with reference to processing segment 41, the IMSI_S digits 55 are loaded into digit positions $d_1$ . . . $d_{10}$, the IMSI_11_12 digits 53 are loaded into IMSI array 45 digit positions $d_{11}$ and $d_{12}$, and the MCC digits 51 are loaded into digit positions $d_{15}$, $d_{14}$ and $d_{13}$ of the IMSI array 45.

Figure 9:
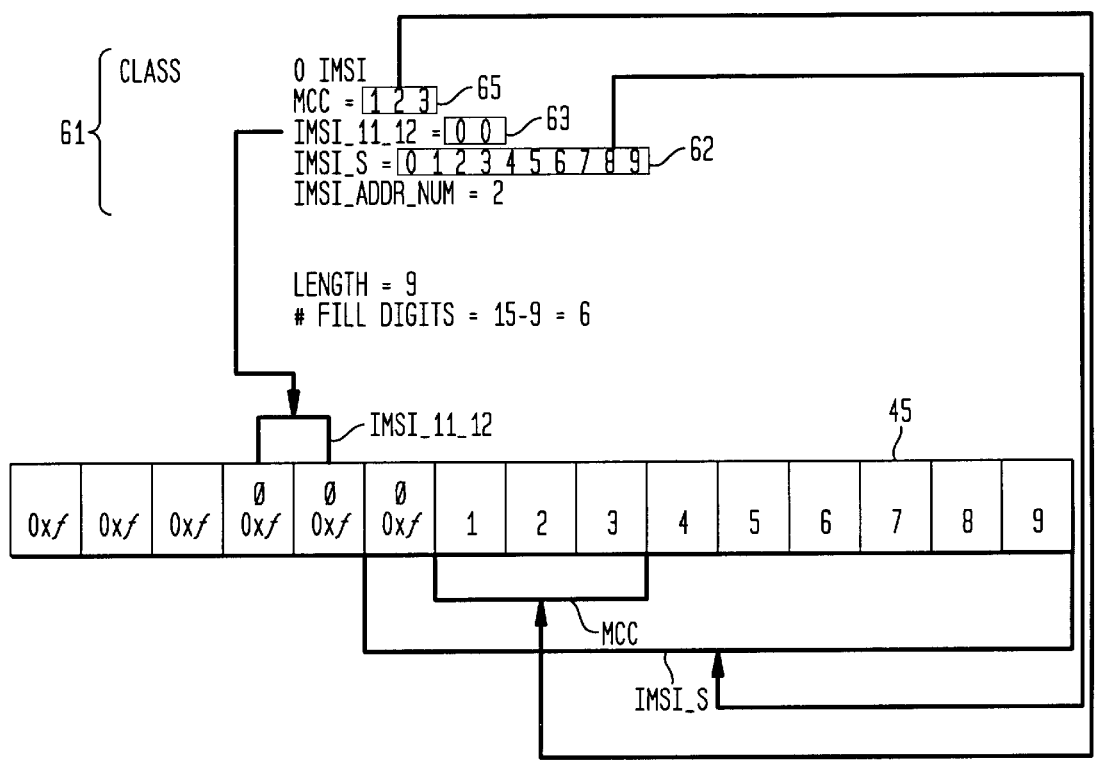
FIG. 9 illustrates a second example of the results obtained by the conversion algorithm depicted in FIGS. 7A, 7B, and 7C.

FIG. 9 illustrates an example where a class 1 IMSI 61 is received, that is, where the IMSI is less than 15 digits long. In this instance, the IMSI_S digits 62 are loaded into digit positions $d_1$ . . . $d_{10}$, the IMSI_11_12 digits 63 are loaded into digit positions $d_{11}$ and $d_{12}$, but the MCC digits 65 are now loaded into 3-digit positions calculated in accordance with processing segment 41 as $d_{imsi\ length}$ through $d_{imsi\ length-2}$. Thus, as shown in the example of FIG. 9, the MCC has been reloaded into digit positions $d_7$, $d_8$ and $d_9$, and the number of fill digits is equal to 6, each of which is loaded with a binary value of "1111."

Once the IMSI array 45 is loaded, it is now converted into the two binary 32-bit values imsi_1 and imsi_2 illustrated in FIG. 6. The fill value 1111 used in IMSI array 45 is counted and converted to the value zero. The digit zero values (0xa or decimal 10) found in IMSI array 45 are also converted to the value zero in anticipation of the binary encoding. The number of fill values, X, begins at zero and is incremented for each element of IMSI array 45 that is equal to 1111. After incrementing, the element of IMSI array 45 is set to zero. The IMSI length, Y, can then be computed as Y=15 less X. Thus, as shown in segment 15 of FIG. 6, the first three digits $d_1$, $d_2$, and $d_3$ of array 45 are converted to a binary 10-bit value, the second digits $d_4$, $d_5$, and $d_6$ are converted to a binary 10-bit value, and the third set of digits $d_7$, $d_8$ and $d_9$ are converted to a binary 10-bit value. The 30 bits form the first 30 bits of the 32-bit imsi_2 word with the last 2 bits of the imsi_1 word being set to zero.

The imsi_2 word contains digits $d_{10}$, $d_{11}$, and $d_{12}$ of the array 45 encoded as a 10-bit word, digits $d_{13}$, $d_{14}$ and $d_{15}$ encoded as a 10-bit word, and these 20 bits form the first 20 bits of the 32-bit imsi_2. The next 4 bits of imsi_2 is an encoding of the actual length Y which was computed above. Finally, the last 8 bits of imsi_$_{13}$ 2 are set to zero.

Thus, as a consequence of the procedures described above with reference to processing segments illustrated in FIGS. 7A, 7B and 7C, the CDMA over-the-air interface IMSI information illustrated in segment 17 of FIG. 6 is converted into the two imsi_1 and imsi_2 32 bit binary words illustrated in segment 15 of FIG. 6. This is then passed as noted, to call processing software 21 for use in authentication, registration, SMS or other call processing operations.

Figure 10:
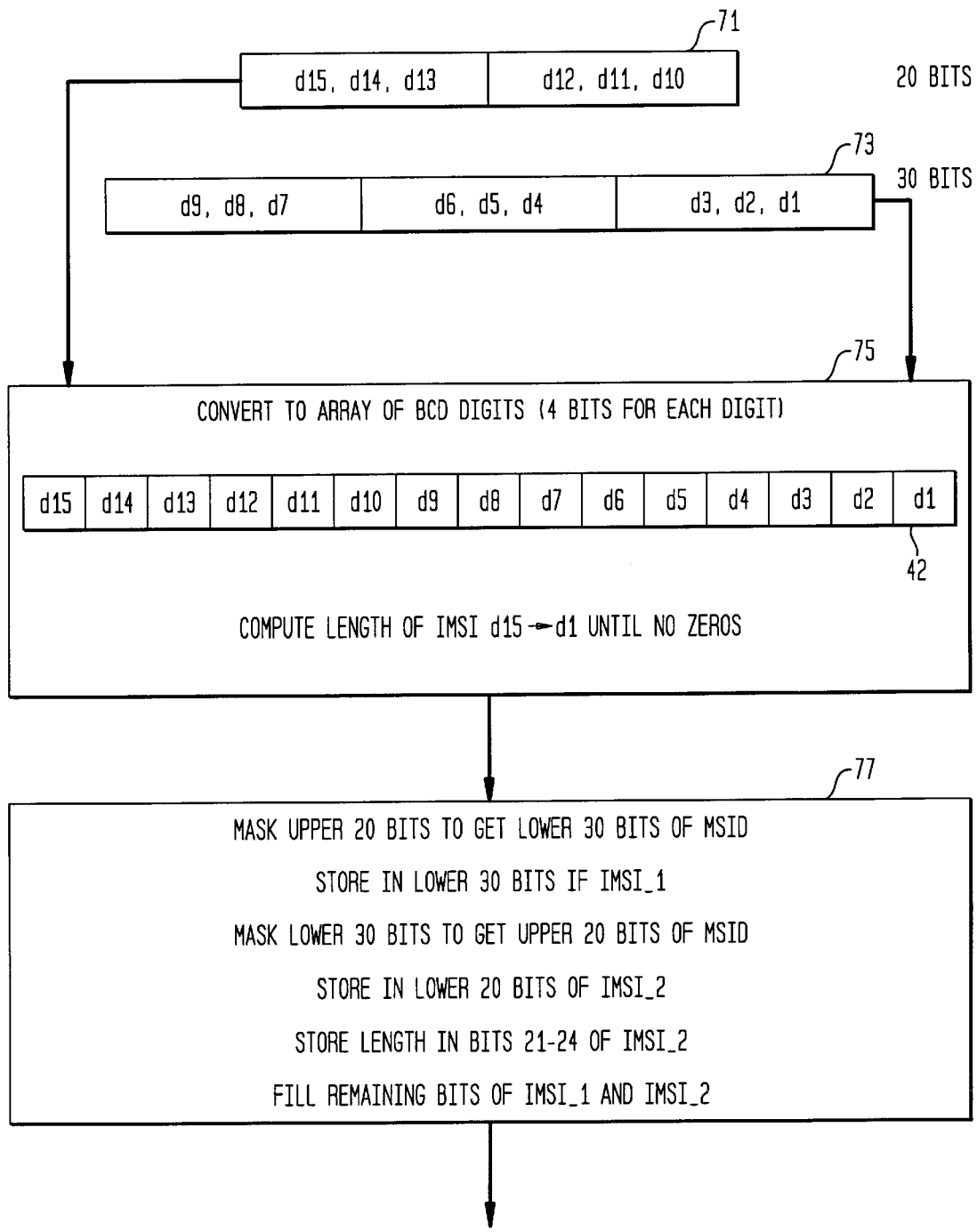
FIG. 10 illustrates a TDMA conversion algorithm illustrated in FIG. 6.

Thus far, conversion of the IMSI information as received in the CDMA air interface format has been described. Next, we describe receipt of the IMSI information in a TDMA format and the conversion of same using the conversion software 13 illustrated in FIG. 6. The conversion software is illustrated in FIG. 10.

The received TDMA 50-bit IMSI information is first split into a 30-bit stream 73 which includes the digits $d_1 \ldots d_9$ and a 20-bit stream 71 which includes the digits $d_{10} \ldots d_{15}$. The digit values are then converted at processing segment 75 to a 15 digit array 42 of binary coded decimal values using 4 bits to encode each digit in processing segment 75. Then, length of the IMSI is computed by examining each of the binary equivalents of the digits $d_{15}$, down through $d_1$ until no 0's are encountered. Thus, if the IMSI is provided in digit positions $d_1 \ldots d_{12}$, this length will be indicated as 12, since digit positions $d_{13}$, $d_{14}$ and $d_{15}$ will be leading 0's.

Once the length of the IMSI has been computed in processing segment 75, the process then proceeds to processing segment 77. Here, the upper 20 bits of the IMSI are masked to provide the lower 30 bits 73, which are stored as the lower 30 bits of imsi_1 (FIG. 6).

Next, the lower 30 bits 73 are masked to obtain the upper 20 bits 71, and these are stored as the lower 20 bits of imsi_2 (FIG. 6). The length of the IMSI as computed in processing segment 75 is then stored as 4 bits in bit positions 21–24 of imsi_2. Finally, the remaining bits of imsi_1 and imsi_2 are filled with 0's.

Referring back to FIG. 6, a TDMA IMSI is converted by the conversion algorithm 13 to the binary representation of IMSI as the words imsi_1 and imsi_2.

As evident from the foregoing discussion, no matter which format the IMSI is received in, a conversion algorithm is provided to convert the IMSI information to a common uniform format which preserves all of the IMSI information needed for call processing, with this information being formatted into two words, imsi_1 and imsi_2, each 32 bits in length. This common format is then passed to the call processing software 21 for call processing operations.

Although the invention has been described and illustrated with respect to specific examples, such as TDMA and CDMA processing, it is also apparent as noted that conversion algorithms can also be provided for other formats which may be used to convert IMSI information received from an over-the-air interface into a common format for call processing. Accordingly, the invention is not to be considered as limited to the specific formats and examples given above, but may be applied to a wide variety of different types of IMSI formats to provide a common uniform format for call processing and/or billing software. Thus, the invention is not to be considered as limited to the specific examples and embodiments described, but is only limited by the scope of the claims appended hereto.

What is claimed as new and desired to be protected by letters patent of the United States is:

1. A method of converting an international mobile station identifier into a uniform processing format comprising:
receiving international mobile station identifier information in an over-the-air format; and
converting said received information into a uniform binary format, said uniform binary format comprising two n-bit binary words and using said uniform binary format for processing within a mobile switching center.

2. A method as in claim 1 wherein said over-the-air format is dictated by a standardization protocol.

3. A method as in claim 2 wherein said over-the-air format is a code division multiple access format.

4. A method as in claim 2 wherein said over-the air format is a code division multiple access format.

5. A method as in claim 1 further comprising utilizing said uniform binary format for resource allocation in a mobile switching center.

6. A method as in claim 1 wherein said received international mobile station identifier information comprises a plurality of identification digits and said uniform format comprises a first and second n-bit binary number, said first n-bit binary number representing a first portion of said plurality of identification digits and said second n-bit binary number representing a second portion of said plurality of identification digits.

7. A method as in claim 6 wherein said plurality of identification digits includes fifteen digits, said first portion representing the first through ninth identification digits and the second portion representing the tenth through fifteenth digits.

8. A method as in claim 7 wherein said first binary number has said digits one through nine encoded as a first 10 bits for digits one, two and three, a second 10 bits for digits four, five and six, a third 10 bits for digits seven, eight and nine.

9. A method as in claim 8 wherein said first binary number contains 32 bits, including the first, second and third 10 bits and two fill bits.

10. A method as in claim 7 wherein said second binary number has said digits ten through fifteen encoded as a first 10 bits for digits ten, eleven and twelve, and a second 10 bits for digits thirteen, fourteen and fifteen.

11. A method as in claim 10 wherein said second binary number contains 32 bits, including said first and second 10 bits and a predetermined number of bits indicating an international mobile station identification information length.

12. A method as in claim 11 wherein said length is encoded in said second binary number as four bits.

13. A method as in claim 12 wherein said second binary number includes eight fill bits.

14. A method of handling international mobile stations identification within a network element comprising:

receiving an international mobile station identification containing up to fifteen digits in a first specified format; and converting said received international mobile station identification to a pair of n-bit binary representations in which a first one of said n-bit binary representations represents a first set of predetermined digits of said identification and a second one of said n-bit binary representation represents a second set of different predetermined digits of said identification.

15. A method as in claim 14 wherein n equals 32.

16. A method as in claim 14 wherein said first n-bit representation represents the digits $d_1$, through $d_9$ and the second n-bit representation represents the digits $d_{10}$ through $d_{15}$.

17. A method as in claim 14 wherein said first format is a format specified in the IS-136 standard.

18. A method as in claim 14 wherein said first format is a format specified in the IS-95 standard.

19. A method as in claim 16 wherein said second n-bit representation includes a representation of the length of said international mobile station identification.

* * * * *